US009339052B1

United States Patent
Schwartz

(10) Patent No.: US 9,339,052 B1
(45) Date of Patent: May 17, 2016

(54) PREMIUM PET FOOD AND PROCESS FOR ITS MANUFACTURE

(75) Inventor: Barry Schwartz, Beverly Hills, CA (US)

(73) Assignee: All-American Pet Company, Inc., Beverly Hills, CA (US)

( * ) Notice: Subject to any disclaimer, the term of this patent is extended or adjusted under 35 U.S.C. 154(b) by 839 days.

(21) Appl. No.: 12/799,067

(22) Filed: Apr. 16, 2010

(51) Int. Cl.
 A23K 1/00 (2006.01)
 A23K 1/18 (2006.01)
 A23K 1/10 (2006.01)

(52) U.S. Cl.
 CPC . *A23K 1/00* (2013.01); *A23K 1/186* (2013.01); *A23K 1/003* (2013.01); *A23K 1/1846* (2013.01)

(58) Field of Classification Search
 CPC ... A23K 1/003; A23K 1/1846; A23K 1/1603; A23K 1/186; A23K 1/10; A23P 1/12
 USPC .................. 426/516, 521, 805, 72, 73, 74
 See application file for complete search history.

(56) References Cited

U.S. PATENT DOCUMENTS

| | | | | |
|---|---|---|---|---|
| 3,882,257 A | * | 5/1975 | Cagle | 426/274 |
| 3,916,029 A | * | 10/1975 | Hildebolt | 426/94 |
| 4,597,731 A | | 7/1986 | Suzuki | |
| 4,910,038 A | * | 3/1990 | Ducharme | 426/641 |
| 4,997,671 A | * | 3/1991 | Spanier | 426/646 |
| 5,558,896 A | | 9/1996 | Kobayashi | |
| 6,344,224 B1 | | 2/2002 | Bazzaro et al. | |
| 6,733,263 B2 | | 5/2004 | Pope et al. | |
| 6,905,703 B2 | * | 6/2005 | Rothamel et al. | 424/439 |
| 7,244,460 B2 | * | 7/2007 | Lee et al. | 426/302 |
| 7,250,186 B2 | | 7/2007 | Pfaller et al. | |
| 7,585,533 B2 | | 9/2009 | Fritz-Jung et al. | |
| 2008/0003270 A1 | | 1/2008 | Martinez | |
| 2008/0233228 A1 | | 9/2008 | Lindee et al. | |

OTHER PUBLICATIONS

Bonnot webpage (http://www.thebonnotco.com/Extruders), 2012.*
National Dog Food (http://web.archive.org/web/20051216061857/http://www.nationaldogfood.com/products.html). 2005.*

* cited by examiner

*Primary Examiner* — Viren Thakur
*Assistant Examiner* — Lela S Williams
(74) *Attorney, Agent, or Firm* — Thomas I. Rozsa

(57) ABSTRACT

The present invention relates to a process of creating semi-moist pet food, and primarily dog food and dog treats, that is formed into a given shape through cooking the ingredients of the mixture contained in the dog food in an extruder and thereafter immediately transforming the mixture to a forming machine wherein the pet food is formed into a multiplicity of given shapes so that the dog food is produced as a final formed dog food or dog treat in an economically viable process. The given shape of the dog food is semi-moist and will retain its shape so that it can be broken into smaller pieces to be fed to a dog at selected times.

6 Claims, 1 Drawing Sheet

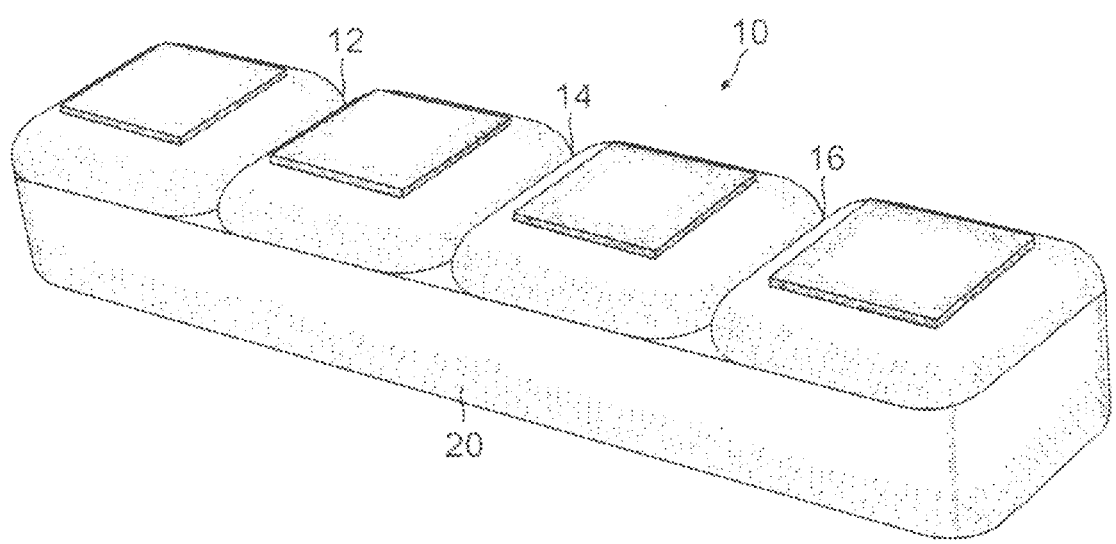

PREMIUM PET FOOD AND PROCESS FOR ITS MANUFACTURE

BACKGROUND OF THE INVENTION

1. Field of the Invention

The present invention relates to the field of pet foods and primarily dog food and dog treats which are formulated of premium dog food ingredients in a semi-moist state. Traditionally, semi-moist dog food is sold in cans or in tins or in sealed packs and after the can or tin or sealed pack is opened, semi-moist dog food is placed into a dog dish where it is consumed by the dog. The present invention relates to the field of a new innovative way of packaging semi-moist dog food so that the food can be dispensed in a more convenient form with a greater density of protein per portion and at times and places when traditional feeding would be difficult.

2. Detailed Description of the Prior Art

In general, the concept of forming specifically shaped foods such as bar-shaped material for human food is known. However, to the best of the present inventor's knowledge, the concept of creating dog food in unique shapes which is semi-moist and is retained together in unique shapes and can be manufactured in a commercially viable way has not been known before the present invention. The following 10 patents and published patent applications are the closest relevant prior art to the present invention:

1. U.S. Pat. No. 4,597,731 issued to Kisaku Suzuki on Jul. 1, 1986 for "Food Shaping Apparatus" (hereafter the "Suzuki Patent");
2. U.S. Pat. No. 5,558,896 issued to Masao Kobayashi on Sep. 24, 1996 for "Method For Cutting A Bar-Shaped Food And Its Apparatus" (hereafter the "Kobayashi Patent");
3. U.S. Pat. No. 5,827,565 issued to Glen S. Axlerod on Oct. 27, 1998 for "Process For Making An Edible Dog Chew" (hereafter the "Axlerod Patent");
4. U.S. Pat. No. 6,344,224 issued to Gianni Bazzaro et al. on Feb. 5, 2002 for "Feed Body For Domestic Animals" (hereafter the "Bazzaro Patent");
5. U.S. Pat. No. 6,733,263 issued to Brent K. Pope et al. on May 11, 2004 for "Composition, Process and Apparatus" (hereafter the "Pope Patent");
6. U.S. Pat. No. 7,250,186 issued to Werner Pfaller et al. on Jul. 31, 2007 for "Extrusion Process, Apparatus and Product" (hereafter the "Pfaller Patent");
7. United States Published Patent Application No. 2008/0003270 to Ion Inaki Garcia Martinez on Jan. 3, 2008 for "Chewable And/Or Edible Product For Pets And Other Animals" (hereafter the "Garcia Martinez Published Patent Application");
8. U.S. Pat. No. 7,390,520 issued to Paul Murrow Dempsey et al. on Jun. 24, 2008 for "Process For Preparing A Chewable Pet Food" (hereafter the "Dempsey Patent");
9. United States Published Patent Application No. 2008/0233228 to Scott A. Lindee et al. on Sep. 25, 2008 for "Food Molding Mechanism For A Food Patty Molding Machine" (hereafter the "Lindee Published Patent Application");
10. U.S. Pat. No. 7,585,533 issued to Cathryn Fritz-Jung et al. on Sep. 8, 2009 for "Pressure Formed Pet Food And Method" (hereafter the "Fritz-Jung Patent").

The Suzuki Patent discloses a food shaping apparatus which contains a multiplicity of rollers which serve to compress the food over a period of time going from the top of the hopper to the bottom of the hopper and compress the food into the shape such as shown in FIG. 4. The shape is primarily round. The patent is designed to show the process of compressing food into a specific shape but it is dealing with human food and not dog food.

The Kobayashi Patent discloses a method of cutting a bar shaped food.

The Axlerod Patent discloses the process for making an edible dog treat. The process includes making a heat expandable dog chew comprised primarily of injection molding potato starch granules and an attractant. The treat is in the shape of a dog bone.

The Bazzaro Patent discloses a fully edible feed body for domestic animals comprising a central core having an elongated shape and a substantially circular or square section, to which at least one layer of seed-based mixture is glued and in which the central core is obtained by extrusion cooking from a mixture based on water, flour, seeds and optionally sugar.

The Pope Patent discloses an apparatus dye and method for preparing a dual textured pet food including a shell enveloping a core.

The Pfaller Patent discloses a process for the manufacture of cooked cereals or dry pet food by preparing a mixture of water and a dry premix comprising cereal, flour or semolina and pressing the mixture, with the aid of a gear pump, to a heat exchanger and then to a dye where it is extruded.

The Garcia Published Patent Application discloses a chewable pet treat which includes a fibrous collagen used to prepare a product wherein the fibrous collagen matrix is formed in any shape of a three dimensional design.

The Dempsey Patent discloses a process for preparing a chewable pet food which includes between 56% and 80% dry wheat gluten mix, 9% to 28% liquid plasticizer mix and between 8% to 18% moisture by weight.

The Lindee Published Patent Application discloses a food molding mechanism for forming a food patty which is for human consumption.

The Fritz-Jung Patent discloses a pet food and method for manufacturing the pet food which includes extruding a base meal formula, grinding the extruded meal and pressure forming the ground meal into solid form.

Overall, no one has conceived of the idea of having a semi-moist dog treat formed into a predetermined shape which can be broken into one or more separate sections and fed to the dog at individual selected times and which can be manufactured in a commercially viable way. There is a significant need for such an improved invention on the market.

SUMMARY OF THE INVENTION

The present invention relates to the commercial production of a premium pet food/treat formulated from proprietary compositions of raw ingredients and nutritional supplements that are first mixed, pasteurized, cooked and then extruded under pressure, into a continuous non-brittle, semi-moist, stable sheet that is then mechanically formed—using a platen and pressure—into a variety of sizes and shapes.

The present invention includes the following advantages:
1. Portability
   Specific starches in the formulation and their successful gelatinization in addition to low fat levels, render the formed shapes durable, stable and palatable
2. Semi-moist presentation with significant palatability
   Humectants and flavoring agents enhance consumption desirability and mask the "taste" impact of the chemical retarding agents
3. Extended shelf stability
   Humectant—Incorporation of Glycerin
   Mold Inhibitor—Potassium Sorbate
   Acidulent—Higher acidic pH retards spoilage 4. Portioning options for pet owner to coincide with size of pet
5. Heart healthy food also serves as a high protein reward/treat
   Supplemental Amino Acids+27% protein content higher than most Other foods/treats
6. Facilitating form factor for functional canine nutritional dietary supplementation The present invention relates to a composition which includes a semi-moist dog food which is formed into a predetermined shape and is retained in a predetermined shape by gelatinzed starches and specific amounts of glycerine so that the dog food and/or treat which is formulated with premium dog food ingredients is shaped into a fixed bar. The protein rich ingredients contained within the premium dog food bar can be fed to a dog as a meal or treat and can be broken in half or in other smaller sections and fed to a dog in smaller sections during different times of the day.

While there have been numerous prior uses of various extruders for the production of dry and semi-moist pet foods and treats as well as the use of mechanical forming machines to produce "pattie" shaped fresh frozen pet foods, there has not been an integrated, continuous processing platform that utilizes both human food quality extruders and pressurized mechanical forming machines in-line to produce a commercially viable premium semi-moist shaped dog food product exemplifying the aforementioned qualities that will meet both the AFFCO standards and FDA requirements and regulations.

The present invention also relates to a process of manufacturing a semi-moist dog food or dog treat into a predetermined shape through a process which produces an efficient quantity of product in a sufficiently rapid period of time so as to make the production of the product commercially viable.

It has been discovered that in order to be able to produce a semi-moist dog food or dog treat formed into a given shape (for example, a bar shape), it is necessary to have the food cooked in a single or twin screw extrusion system which by way of example can be a Magnum Twin Screw Extruder system produced by Wenger Manufacturing and as soon as the food is completely cooked, to have the food transported to a forming machine which by way of example can be a Formax® machine such as a Formax F-19™ which enables the food to be placed onto a tray and immediately formed under pressure and stamped into a large number of bars of a predetermined shape wherein the quantity produced is sufficiently rapid so as to make the production economically viable. It is emphasized that the Wenger Extruder is only one example of a single or twin screw extruder which is within the spirit and scope of the present invention. It is further emphasized that the Formax F-19™ is only one example of a human grade forming machine which is within the spirit and scope of the present invention.

It is an object of the present invention to utilize an extruder such as a Wenger Extruder which is used to cook a dog food mix and transport the cooked dog food from the extruder into a Formax® forming machine which is used to form the cooked dog food into bar shaped sizes.

It is an object of the present invention to create a premium dog food which is retained in a shape such as a fixed rectangular bar or any other desired shape through the inclusion of specific amounts of glycerine so that the dog food which is semi-moist and at least 1% moisture in the meat will retain its desired shape so that it can be fed to a dog either entirely in one full bar shape or can be broken into one or more separate smaller bite size pieces and individually fed to a dog successively, at the same time, or independently during different times of the day.

It is a further object of the present invention to create semi-moist premium dog food in a predetermined shape which can be easily fed to a dog by being broken into individual separate bite size components depending on the size of the dog.

It is another object of the present invention to create a brand of premium dog food which is formed into a predetermined shape so that it can be fed to a dog as a meal or as a treat and can be broken in half or in other smaller incremental amounts and fed to the dog individually while retaining its shape from the original rectangle.

It is another object of the present invention to produce a semi-moist dog food in the desired fixed shape such as a rectangular bar through a process which enables a sufficient quantity of food to be produced in a sufficiently uniform and rapid manner so that it is commercially viable to produce the semi-moist dog food into the shape of a bar.

The present invention has the following unique features:
1. The ingredient formulation/composition is unique to the assignee of the present invention.
2. Processing hardware: a single or twin screw extruder and a human grade forming device—coupled in tandem is unique to the pet food production industry.
3. Processing parameters: pasteurization, cook time and temperature, flow speed and pressure of the extruded slurry is fed directly to the forming machine as a flat sheet to be delineated into various shapes (calorie/energy values) as determined.
4. Final Product: highly digestible, highly palatable, semi moist, high protein premium formed food product that maintains food safe status beyond expectation with lower fat and high bar durability than any other product of its kind.

It is to be understood that both the foregoing general description and the following detailed description are exemplary and explanatory only and are not restrictive of the invention as claimed.

The accompanying drawings which are incorporated in and constitutes a part of the specification, illustrate one embodiment of the invention and together with the description, serve to explain the principles of the invention.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 1 is a perspective view of the present invention finished semi-moist premium dog food formed into the shape of a rectangular bar with divisions so that the bar can be broken into smaller pieces.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Reference is made to the accompanying attachment of a web page printout describing a Wenger Magnum Twin Screw Extruder machine. It is emphasized that this is only one example of an extruder machine that is used with the present invention. The present invention incorporates utilization of a single or twin screw extruder. The Magnum Twin Screw Extruder is co-rotating, fully intermeshing, self-wiping in design. Due to the Magnum's modular design length-to-diameter ratios are 7.5:1 to 25.5:1 are available. Barrel segments are each equipped with cavities for circulating thermal fluids for heating and/or cooling. The ratio of area of thermal fluid contact to the area of extrudate contact provides the highest thermal heat transfer rates possible—improving process control by assuring precise control of product temperature/time history. Wenger extruders assure greater production capacity with less energy consumption. This lower specified mechanical energy input is the result of the unique design of the screw flighting and the barrel ribbing. The combination of flight depth, pitch profile, and equivalent helix angle optimize the conversion of mechanical energy into heat through friction while minimizing shear damage.

The present invention utilizes the extruder system such as the Magnum Twin Screw Extruder series produced by Wenger. The premium dog food mixture includes the following ingredients: chicken meal, oat groats, rice, glycerine, chicken fat (preserved with mixed tocopherols), potato protein, natural flavor, chicken, flaxseed meal, beet pulp, dicalcium phosphate, potassium chloride, sodium chloride, choline chloride, L-Ascorbyl-2-Phosphate (protected source of Vitamin C), Vitamin A acetate, Vitamin D3 supplement, Vitamin E supplement, thiamine, niacin, calcium pantothenate, riboflavin, pyridoxine hydrochloride, folic acid, biotin, Vitamin B12 supplement, taurine, zinc propionate, ferrous sulfate, copper sulfate, zinc sulfate, manganese citrate, potassium iodide, sodium selenite, mixed tocopherols (a natural preservative), and L-carnitine. The mixture is then placed into the extruder. The first step is pasteurization of the ingredient mixture. By way of example, the extruder heats the mixture to 212° for one minute so that the mixture is pasteurized. The mixture is then placed under pressure and cooked in the extruder at temperature range of approximately 150° F. to 200° F. and anywhere from approximately thirty minutes to sixty minutes. Thereafter, the mixture is formed into an elongated slurry and immediately fed under pressure into a forming machine. By way of example, the pressure exerted on the "slurry" or "mash" of the ingredients of the mixture when fed out of the extruder is approximately 300 PSI.

By way of example, the composition percentage of the ranges of the components of the ingredients in the mixture can be as follows:
Chicken Meal 25% to 30%
Oat Groats 20% to 25% Rice 10% to 14.85%
Glycerin 5% to 7%
Chicken Fat (Preserved with Mixed Tocopherols) 8% to 10%
Potato Protein 8% to 10% Natural Flavor 1.75% to 2%
Chicken 3% to 5%
Flaxseed Meal 1.5% to 2% Beet Pulp 3% to 4%
Dicalcium Phosphate 1.0% to 2% Potassium Chloride 0.6% to 1% Sodium Chloride 0.3% to 7% Choline Chloride 1200 ppm
L-ascorbyl-2-phosphate (Protected Source of Vitamin C) 0.035%
Vitamin A Acetate 15000 11.1/kg Vitamin D3 Supplement 1500 IU/kg
Vitamin E Supplement 150 IU/kg Thiamine 10 ppm
Niacin 70 ppm
Calcium Pantothenate 25 ppm Riboflavin 10 ppm
Pyridoxine Hydrochloride 10 ppm Folic Acid 1.5 ppm
Biotin 0.2 ppm
Vitamin B12 Supplement 0.035 ppm
Taurine 1000 ppm
Zinc Propionate 0.3% to 0.1%
Ferrous Sulfate 80 ppm
Copper Sulfate 8 ppm
Zinc Sulfate 120 ppm
Manganese Citrate 5 ppm
Potassium Iodide 1.5 ppm
Sodium Selenite 0.03 ppm
Mixed Tocopherols (Natural Preservative) 0.06% to 0.3%
L-carnitine 40 ppm It will be appreciated that the present invention includes the composition selected from the group consisting of the above-listed ingredients and that it is possible to eliminate one or more of the ingredients and still be within the spirit and scope of the present invention.

The object is to have the cooked dog food formed of approximately 85% dry matter and 15% moisture. By way of example, the percentage components in the premium dog food mix include between 1% and 15% water and moisture and the balance combined protein, fat, fiber, calcium and phosphorous which is dry matter.

After the dog food has been cooked, it is then forwarded to a bar forming machine such as a Formax F-19™. This Formax machine is only one example of a forming machine that is envisioned within the present invention. Accompanying this application is a printout of a web page showing Formax F-19™ machine. The Formax F-19™ features a hydraulic forming injection system for extremely accurate weight control and the capacity to process a wide range of products. With operation independent of the hydraulic forming system, the mold plate drive powers the F-19™ to speeds up to 75 strokes per minute. The PLC F-19 Touch Screen™ maximizes productivity with fast setup times, graphical interface and approved maintenance diagnostics. One hundred product codes with a preprogrammed or custom fill modes are offered. After the premium dog food is cooked as described above, the food is placed into a Formax® machine where it is spread on a rectangular sheet and a plate drops down with eight or nine bar shapes onto the dog food at 55 to 75 strokes per minute creating 440 to 675 bars per minute. The Formax F-19™ machine is used to create human grade products (hamburger patties, sausage links, chicken tenders, etc.). The present invention utilizing this F-19 Formax™ machine produces extremely high quality and stable rectangular bar shaped premium dog food products.

It is a unique feature of the present invention to incorporate the combination of a single or twin screw extruder and a human grade forming device—coupled in tandem. This is unique to the pet food production industry. Pasteurization, cook time and temperature, flow speed and pressure of the extruded slurry from the extruder is fed directly to the forming machine as a flat sheet to be delineated into various predetermined shapes. Therefore, the final product is a highly digestible, highly palatable, semi-moist, high protein premium formed food product that maintains food safe status beyond expectation with a lower fat and greater resistance to bacterial deterioration than any other product of its kind.

The key feature of the present invention is that the ingredients as described above are cooked in a single screw or twin screw extruder and then fed as a slurry onto a flat sheet of a human grade forming machine where they are cut to the desired shapes. The desired shape can be any desired shape such as bar shaped, the shape of any animal, reptile, fish, amphibian, mammal, bird; celestial body or any other physical shape. The example given below is the product formed into a bar shape. It is emphasized that the bar shape depicted in FIG. 1 below is strictly one example of the numerous types of shapes that can be formed through the present invention process.

Referring to FIG. 1, there is illustrated one example the final completed semi-moist premium dog food shaped into the form of a rectangular bar 10. By way of example, the bar can be 5¼ inches long, 1¼ inches wide and ¾ inches high. The bar is retained together by the formulation as described above in being cooked with the composition as set forth above at the temperatures and times as set forth above and is retained together by the specific amounts of glycerine and gelatinzed starches so that the bar or other shapes remain in a stable form. The bar or other shapes may have formed into them selected identifying divisions such as 12, 14 and 16, so that the divisions serve to divide the body 20 of the shaped food or treat 10 into a variety of portion sizes. Therefore, the bar or other shapes can be broken into smaller pieces by breaking the bar, or other shapes, at the location of the divisions 12, 14 and 16 so that a smaller quantity can be fed to the dog at a given time. The idea is that the bar will retain its shape so that it can be broken into several separate segments and fed to the dog at individual times or at individual successive periods of time or fed to the dog as an entire bar depending upon the size of the dog and the amount of food that is desired to be fed to the dog at a given time.

Through use of the present invention, premium dog food is formed into a predetermined shape and is retained in the rectangular bar shape or any other desired shape through the use of specific amounts of glycerine and gelatinized starches so that the bar will remain in its formed shape after it exits the Formax® forming machine. The bar contains semi-moist dog food which in its preferred embodiment is anywhere from 1% to 15% moisture. The meat contained in the bar is a premium dog mix and is retained in its original bar shape through the cooking process and forming process as described above so that it can be retained and fed as an individual rectangular shaped bar or broken into separate smaller sections so that individual sections of the bar can be fed to a dog at separate times.

While the preferred shape of the dog food is in a rectangular bar, it will be appreciated that the dog food can also be formed into other shapes of food as long as it is held together and is capably broken into at least two sections.

In addition to the semi-moist dog food being formed in the shape of a bar or any other desired shape with the percentage ranges of products as identified above, it is also a key innovation of the present invention to be able to create these semi-moist dog food bars in a commercially viable way. The concept is to have the food cooked in an extruder such as the Wenger extruder for the desired temperature range and the desired cooking time and thereafter immediately have the food transported to a forming machine such as Formax F-19™ machine either by having a direct connection from the exit of the extruder to the input of the forming machine or having the food placed into a separate dish or other mechanical retaining mechanism and thereafter feeding the cooked dog food into the forming machine. The key is the use of a forming machine that enables a sufficient quantity of bars to be produced in sufficient speed so that it is commercially viable to be able to produce the bars at a cost for which it can be commercially sold in the marketplace. After the bars are formed in the forming machine, they are then placed on a conveyer belt where they are cooled and thereafter sent to a wrapping machine where they are individually wrapped for commercial sale.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A process for making a formed pet food consisting of:
   a. combining a total ingredient mixture consisting of chicken meal, oat groats, rice, glycerine, chicken fat, mixed tocopherols, potato protein, natural flavor, chicken, flaxseed meal, beet pulp, dicalcium phosphate, potassium chloride, sodium chloride, choline chloride, L-Ascorbyl-2-Phosphate, Vitamin A acetate, Vitamin D3 supplement, Vitamin E supplement, thiamine, niacin, calcium pantothenate, riboflavin, pyridoxine hydrochloride, folic acid, biotin, Vitamin B12 supplement, taurine, zinc propionate, ferrous sulfate, copper sulfate, zinc sulfate, manganese citrate, potassium iodide, sodium selenite and L-carnitine;
   b. placing said total ingredient mixture set forth in element "a" into an extruder and pasteurizing said total ingredient mixture in the extruder, after pasteurization cooking the total ingredient mixture in the extruder at a temperature in the range of approximately 150° F. to 200° F. for a time range of approximately 30 minutes to 60 minutes, forming the total ingredient mixture into an elongated slurry, and feeding the total ingredient mixture which has been formed into an elongated slurry from the extruder into a forming machine under approximately 300 PSI;
   c. spreading the total ingredient mixture formed into an elongated slurry and fed into the forming machine into a spread slurry fed onto a rectangular sheet and causing the forming machine to form the spread slurry into a multiplicity of uniformly shaped bars resulting in formed, semi-moist pet food including glycerine in the range of 5% to 7% of the total semi-moist pet food and gelatinized starches which are a combination of oat groats, rice and flaxseed meal in the total semi-moist pet food being in the range of 8% to 10% of the total semi-moist pet food, the chicken meal in the range of 25% to 30% of the total semi-moist pet food and thereafter placing the formed semi-moist pet food onto a conveyer belt to enable the formed semi-moist pet food to be cooled and thereafter sent to a wrapping machine where each individually formed semi-moist pet food is individually wrapped.

2. The process for making a formed pet food in accordance with claim 1, wherein the starting percentages of the total ingredient mixture in element "a" of claim 1 are in the following ranges:
   a. Chicken meal 25% to 30%;
   b. Oat Groats 20% to 25%;
   c. Rice 10% to 14.85%;
   d. Glycerine 5% to 7%;
   e. Chicken fat 8% to 10%;
   f. Potato Protein 8% to 10%;
   g. Natural Flavor 1.75% to 2%;
   h. Chicken 3% to 5%;

i. Flaxseed Meal 1.5% to 2%;
j. Beet Pulp 3% to 4%;
k. Dicalcium Phosphate 1.0% to 2%;
l. Potassium Chloride 0.6% to 1%;
m. Sodium Chloride 0.3% to 7%;
n. Choline Chloride 1200 ppm;
o. L-ascorbyl-2-phosphate 0.035%;
p. Vitamin A Acetate 15000 11.1/kg;
q. Vitamin D3 Supplement 1500 IU/kg;
r. Vitamin E Supplement 150 IU/kg;
s. Thiamine 10 ppm;
t. Niacin 70 ppm;
u. Calcium Pantothenate 25 ppm;
v. Riboflavin 10 ppm;
w. Pyridoxine Hydrochloride 10 ppm;
x. Folic Acid 1.5 ppm;
y. Biotin 0.2 ppm;
z. Vitamin B12 Supplement 0.035 ppm;
aa. Taurine 1000 ppm;
bb. Zinc Propionate 0.3% to 0.1%;
cc. Ferrous Sulfate 80 ppm;
dd. Copper Sulfate 8 ppm;
ee. Zinc Sulfate 120 ppm;
ff. Manganese Citrate 5 ppm;
gg. Potassium Iodide 1.5 ppm;
hh. Sodium Selenite 0.03 ppm;
ii. Mixed Tocopherols 0.06% to 0.3%; and
jj. L-carnitine 40 ppm.

3. The process for making a formed pet food in accordance claim 1, wherein the formed semi-moist pet food in element "c" of claim 1 has 15% moisture matter and 85% dry matter.

4. The process for making a formed pet food in accordance with claim 1, wherein the formed shape of the semi-moist pet food in element "c" of claim 1 is in the shape of a bar 5¼' long, 1¼" wide and ¾" high.

5. The process for making a pet food in accordance with claim 1 wherein the semi-moist pet food in element "c" of claim 1 is dog food.

6. The process for making a pet food in accordance with claim 1 wherein the formed shape of the semi-moist pet food in element "c" of claim 1 is selected from the group consisting of bar-shaped, an animal, a reptile, a fish, an amphibian, a mammal, a bird, a celestial body or any other physical shape.

* * * * *